United States Patent [19]

Brescia et al.

[11] 4,158,336
[45] Jun. 19, 1979

[54] KNOCK DOWN SHELVING SYSTEM WITH CORNER CLIPPED CONNECTORS

[75] Inventors: Anthony J. Brescia, Liverpool, N.Y.; Edward G. Fecca, Kitchener, Canada; Stephen Wenczl, Fayetteville; Theodore W. Schriever, Syracuse, both of N.Y.

[73] Assignee: Dart Industries Inc., Los Angeles, Calif.

[21] Appl. No.: 940,811

[22] Filed: Sep. 8, 1978

[51] Int. Cl.² ............................................... A47B 3/06
[52] U.S. Cl. .................................. 108/111; 403/170; 108/156
[58] Field of Search ............... 108/111, 114, 153, 156, 108/53.5, 101; 211/189, 186, 182; 403/170, 175

[56] References Cited

U.S. PATENT DOCUMENTS

| 657,661 | 9/1900 | Kinnear | 108/111 |
|---|---|---|---|
| 1,204,174 | 11/1916 | Magee | 108/114 |
| 2,585,111 | 2/1952 | Grauer | 108/114 X |
| 3,765,344 | 10/1973 | Ferdinand et al. | 108/111 |
| 4,050,386 | 9/1977 | Kellogg | 108/111 |

Primary Examiner—Francis K. Zugel
Attorney, Agent, or Firm—Kenneth J. Hovet

[57] ABSTRACT

The shelving system includes a plurality of shelves each having square shelf openings at each corner. A plurality of leg supports in turn have upper end portions receivable in the bottom of the shelf openings and lower end portions receivable in the top of the shelf openings and within the upper end portions of the leg supports positioned in the bottom of the shelf openings so that the upper end portions of legs are nested in the shelf openings and the lower end portions of legs extending into the top of the shelf openings are nested within the upper end portions of these legs. Any number of successive shelves can be assembled to the top end portions of the upper legs. The nested square shelf opening, upper end portion of a leg and lower end portion of another leg at each corner are secured or mechanically locked by manually passing a clip through the nesting side walls. Towards this end there are provided windows in the nested side walls which are in registration when the leg members and shelves are properly assembled for receiving the clip. Any desired shelving configuration according to a user's wishes can thus be assembled and/or disassembled without the need of tools.

7 Claims, 8 Drawing Figures

KNOCK DOWN SHELVING SYSTEM WITH CORNER CLIPPED CONNECTORS

BACKGROUND OF THE INVENTION

This invention relates to knock-down shelving systems primarily for use in homes wherein either a free standing or a wall-hung shelving system can be manually assembled by a consumer in accord with his or her desires.

There are presently available many different types of knock-down shelving systems capable of being assembled into various configurations in accord with a consumer's desires. In some of these known systems, shelves and shelf separating supports such as leg supports are simply secured together by frictionally interfitting parts. Others require the use of screws or bolts and thus tools such as a screwdriver or pliers for assemblying the same.

In the case of interfitting friction parts, while assembly can normally be carried out manually without the need of tools, once the shelving system has been assembled, there is always the possibility of the same falling apart when attempting to move it from one location to another; for example, as by grasping the top shelf. In the case of those types of shelving systems secured by screws or bolts, while a mechanically reliable final structure results which can readily be moved from one location to another without risk of the same falling apart, should the user wish to rearrange the shelves or simply disassemble the shelving arrangement, screwdrivers, pliers, or equivalent tools are usually necessary and the operation is somewhat time consuming.

It would be highly desirable if a versatile type shelving system could be provided capable of a free standing configuration or a wall-hung application which could readily be assembled and disassembled by a consumer without the need of tools and yet when once assembled is sufficiently mechanically locked that the assembly can be moved from one location to another without fear of the component parts becoming separated.

SUMMARY OF THE INVENTION

With the foregoing in mind, the present invention contemplates an improved knock-down shelving system incorporating manually insertable and removable securing means for locking a built-up assembly in its completed configuration, all to the end that assembly or disassembly can readily be carried out manually without the need of tools and yet the completed assembly itself can easily be moved from one location to another without risk of separation of the component parts.

Briefly, the preferred embodiment comprises a plurality of shelves having shelf openings together with a plurality of leg supports each having an upper end portion receivable in the bottom of a shelf opening and a lower end portion receivable in the top of the shelf opening and within the upper end portion of leg supports already positioned in the bottom shelf opening. Manually insertable securing means are provided for passing through the side wall portions of the shelf opening, upper end portion and lower end portion of the legs when nested together to secure the leg supports to the shelves. These manually insertable securing clip means can be manually removed as easily as they are inserted for quick disassembly.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
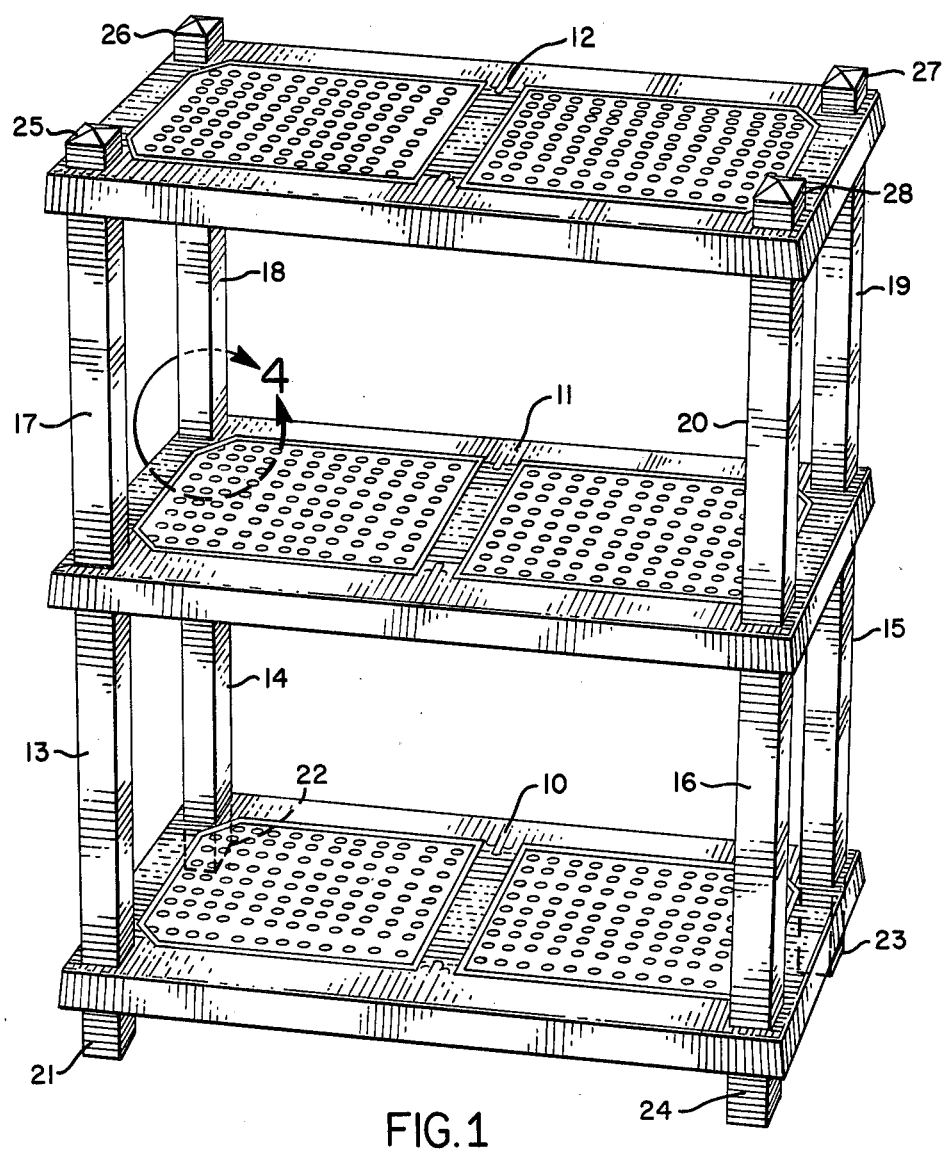
FIG. 1 is a perspective view of a free standing assembled shelving system in accord with the present invention.

Referring first to FIG. 1, there are shown a plurality of assembled shelves 10, 11 and 12. A plurality of leg supports each of a length corresponding to the vertical spacing between shelves are shown at 13, 14, 15 and 16 extending between the corners of shelves 10 and 11 and at 17, 18, 19 and 20 extending between the corners of the shelves 11 and 12.

Foot supports in turn are shown at the bottom or underside corners of the bottom-most shelf 10 as at 21, 22, 23 and 24 while caps 25, 26, 27 and 28 finish off the top corners of the topmost shelf 12.

The shelves 10, 11, and 12 and any number of additional shelves are all identically constructed. Similarly, the leg supports 13 through 20 as well as additional leg supports as required are all identically constructed. Each of the foot supports are identically constructed and each of the caps are identically constructed, certain portions of these components being identical to certain portions of the legs, all as will become clearer as the description proceeds.

The basic components described above are preferably comprised of a thermoplastic material but of course any appropriate material may be used.

It will be appreciated that by utilizing further leg supports and further shelves, any number of shelves can be tiered together, the bottom-most shelf being supported on its underside by the leg supports and the topmost shelf being finished off by the caps. Any particular shelving system assembled by a consumer is lightweight, attractive, and as will become clearer as the description proceeds, easily assembled and disassembled. Such shelving assembly provides storage or means for displaying various household items. Because many different types of assemblies can be created, maximum use and placement in the home in accord with a user's needs and desires is readily realized.

In addition to the four basic components in the form of the shelves, support legs, foot supports and caps, there are provided clip securing means for mechanically locking the legs to the corners of the shelves and the foot rest and caps in appropriate positions, all as will become clearer as the description proceeds. Finally, there may also be provided appropriate wall hanging supports so that an assembled shelving arrangement can be hung from a wall.

Figure 2:
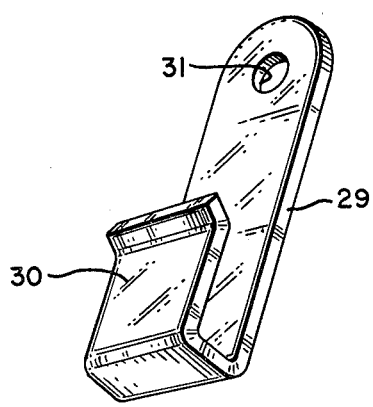
FIG. 2 is an enlarged perspective view of a wall hanging support.

FIG. 2 shows one such wall hanging support in the form of a metal strip 29 having a lower portion bent into a hook shape as at 30 and an upper portion with a fastening receiving hole 31 for securement to a wall.

Figure 3:
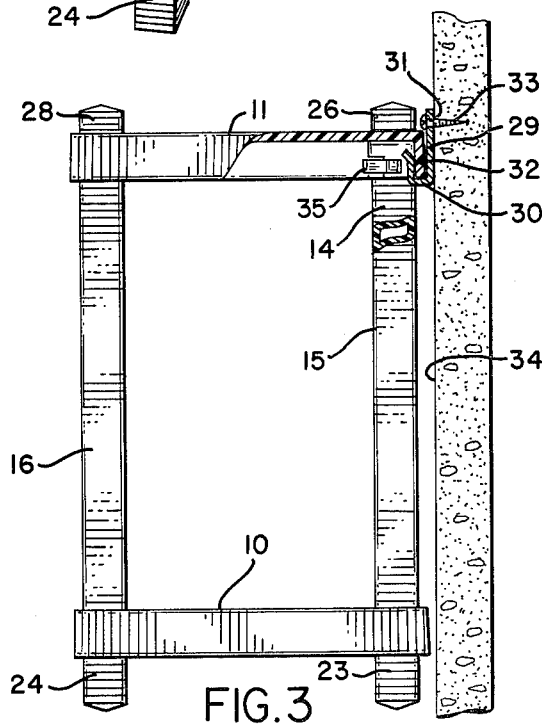
FIG. 3 is a side elevational view partly broken away of some of the shelves illustrated in FIG. 1 reassembled for hanging on a wall.

FIG. 3 shows, merely by way of example, a shelving arrangement reconstructed from the two shelves 10 and 11 of FIG. 1 for hanging on a wall. In this reassembled shelving system, the legs 17, 18, 19 and 20 of FIG. 1 have been removed and the top caps 25, 26, 27 and 28 disposed to finish off the top surface of the shelf 11.

Referring particularly to the cut-away portion of the shelf 11 in FIG. 3, it will be noted that each shelf includes downwardly depending side walls such as indicated at 32. The wall hanging support 29 has its lower hook portion 30 engaging about the lower edge of this depending wall 32. A screw fastening 33 is shown passed through the upper opening 31 of the wall support 29 to secure the same to a wall 34.

It will be understood that at least two such wall supports 29 preferably disposed adjacent the corner portions of the shelf 11 would be provided to stabilize the structure.

Still referring to the broken away portion of FIG. 3, there is illustrated an exterior portion of one of the heretofore referred to securing clips 35 which mechanically locks the leg support 14 and cap 26 to a corner of the shelf.

The manner in which the leg supports and shelves as well as the caps and foot rests are mechanically locked by the securing clips will now be described in detail in conjunction with FIGS. 4 through 7.

Figure 4:
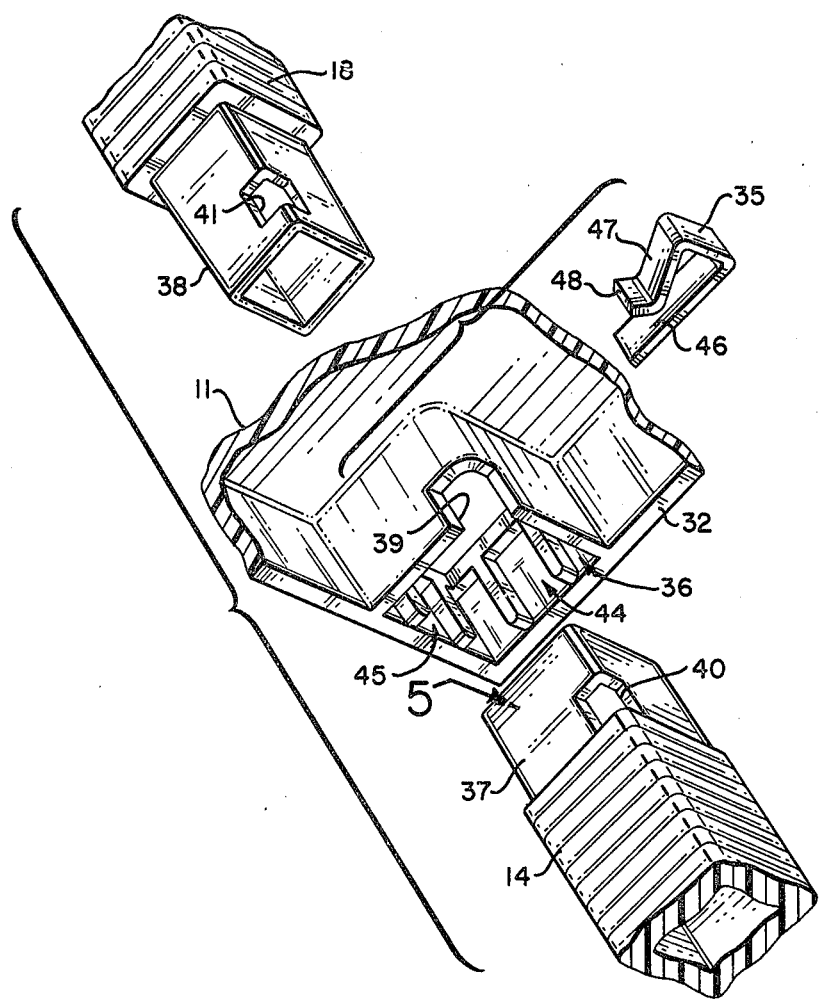
FIG. 4 is an enlarged exploded fragmentary perspective view of the portion of the shelving structure enclosed within the circular arrow 4 of FIG. 1.

Referring first to FIG. 4, there is shown in fragmentary exploded view the leg support 14, underside corner portion of the shelf 11 and the leg support 18 together with one of the clips 35 for securing the same together in the assembled position illustrated in FIG. 1 within the circular arrow 4.

Referring first to the corner of the shelf 11, it will be noted that there is defined a square shelf opening 36 two of the walls of which are formed by the downwardly depending wall 32 of the shelf 11.

Exploded away from and below the opening 36 is shown an upper end portion 37 of the leg support 14. This upper end portion is also of square cross section dimensioned to be received within the bottom of the square shelf opening 36.

Shown above the shelf 11 is a lower end portion 38 for the leg support 18 also of square cross section less than the square cross section of the upper end portion 37 of the leg 14. The dimensioning is such that the lower end portion 38 can be received in the top of the shelf opening 36 and also within the upper end portion 37 of the leg 14 so that the same are nested together.

It will be noted that a wall portion of the square shelf opening 36 includes a window or notch cut-out 39. Also, the upper end portion 37 of the leg 14 includes a window cut-out 40 and the lower end portion 38 of the leg support 18 includes a window cut-out 41. The arrangement is such that when the upper end portion 37 is received within the square shelf opening 36 and the lower end portion 38 received within the upper end portion 37, the windows 39, 40 and 41 will all be in registering relationship.

To assure that the upper end portion 37 is properly oriented so that when inserted in the square shelf opening 36, the windows 39 and 40 will register, appropriate cooperating means are provided on the exterior wall of the upper end portion 37 and interior wall of the square shelf opening 36.

Figure 5:
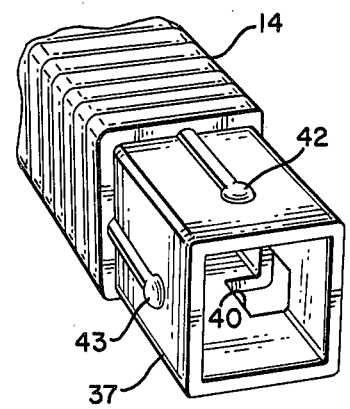
FIG. 5 is a fragmentary perspective view showing a portion of the upper end of a leg support not visible in the view of FIG. 4.

Referring specifically to FIG. 5, the foregoing cooperating means takes the form of lateral projections in the form of hemispherical nubs 42 and 43 on the exterior walls of the upper end portion 37 not visible in FIG. 4. These lateral projections or nubs are arranged to be received in correspondingly formed channels 44 and 45 on interior wall portions of the square shelf opening 36.

Still referring to FIG. 4 there is shown exploded laterally to the right of the square shelf opening 36 one of the clips 35. This clip comprises spring metal bent into a U-shape one of the arms 46 thereof being manually receivable through the registering windows when the legs and corner portion of the shelf are assembled. The other arm 47 of the clip 35 is arranged to extend along the exterior wall of the square shelf opening 36 as will become subsequently evident. The extreme end or tip of this other arm 47 has an outwardly turned portion 48 to facilitate initial engagement of this other arm with the exterior wall.

Figure 6:
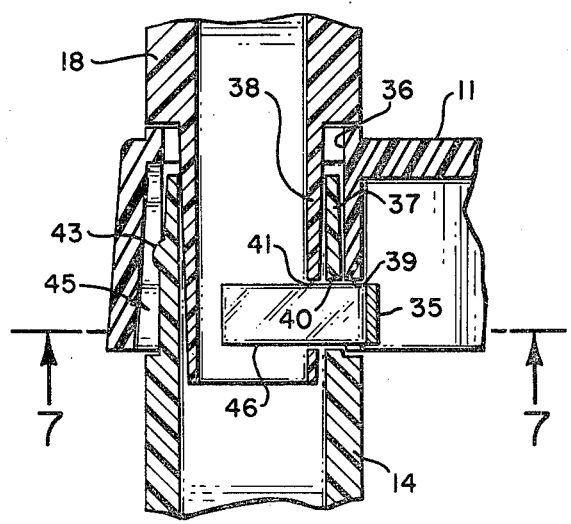
FIG. 6 is a fragmentary cross section of the components illustrated in FIG. 4 in assembled relationship.

Referring now to FIG. 6, there is shown in cross section the components in assembled relationship described in FIG. 4. Thus, the registration of the windows 39, 40 and 41 will be evident when the upper end portion 37 is fully axially seated within the square shelf opening 36 and the lower end portion 38 of the leg 18 fully received within the upper end portion 37. Also, the one arm 46 of the clip 35 is shown passing through the registering windows to mechanically lock the structure together. Also shown in FIG. 6 is the lateral projection 43 on the upper end portion 37 received within the channel 45.

Figure 7:
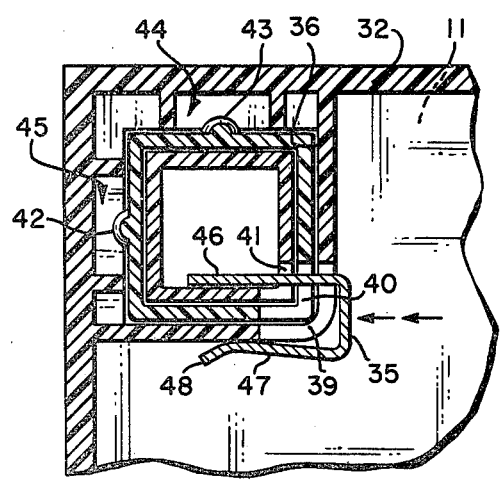
FIG. 7 is a fragmentary cross section taken in the direction of the arrows 7—7 of FIG. 6; and, FIG. 8 is an exploded perspective view of the various components making up the shelving system of this invention and the manner in which they can be packaged for shipment.

In the cross section of FIG. 7, the other arm 47 of the clip 35 is shown extending along and engaging the exterior wall of the square shelf opening 36 as described when the clip 35 is fully inserted. During this insertion, it can be understood from FIG. 7 the manner in which the outwardly turned tip 48 of the arm 47 of the clip will initially engage the window edge of the square shelf opening 36 to ride over the same to the fully inserted position. Finally, it should be noted that the one arm 46 of the clip 35 is longer than the other arm 47. This structure together with the outwardly turned tip 48 greatly facilitates manual insertion of the clip, the one arm 46 first being positioned through the registering window openings and the other arm then simply riding along the exterior surface of the square shelf opening wall.

Referring once again to FIG. 4, it should be understood that each leg support is identically constructed. Thus, each leg support will have an upper end portion identical to upper end portion 37 for the leg 14 and a lower end portion identical to the lower end portion 38 for the leg 18. Moreover, each of the leg supports 21 through 24 described in FIG. 1 will have an upper end portion identical to 37 for the leg 14 while each of the caps 25 through 28 of FIG. 1 will have a lower end portion identical to the lower end portion 38 for the leg 18. Thus, securement of the foot supports and the caps at the corner shelf openings will be identical to that described for the legs 14 and 18 in FIG. 4, other appropriate clips identical to the clip 35 being utilized.

Figure 8:
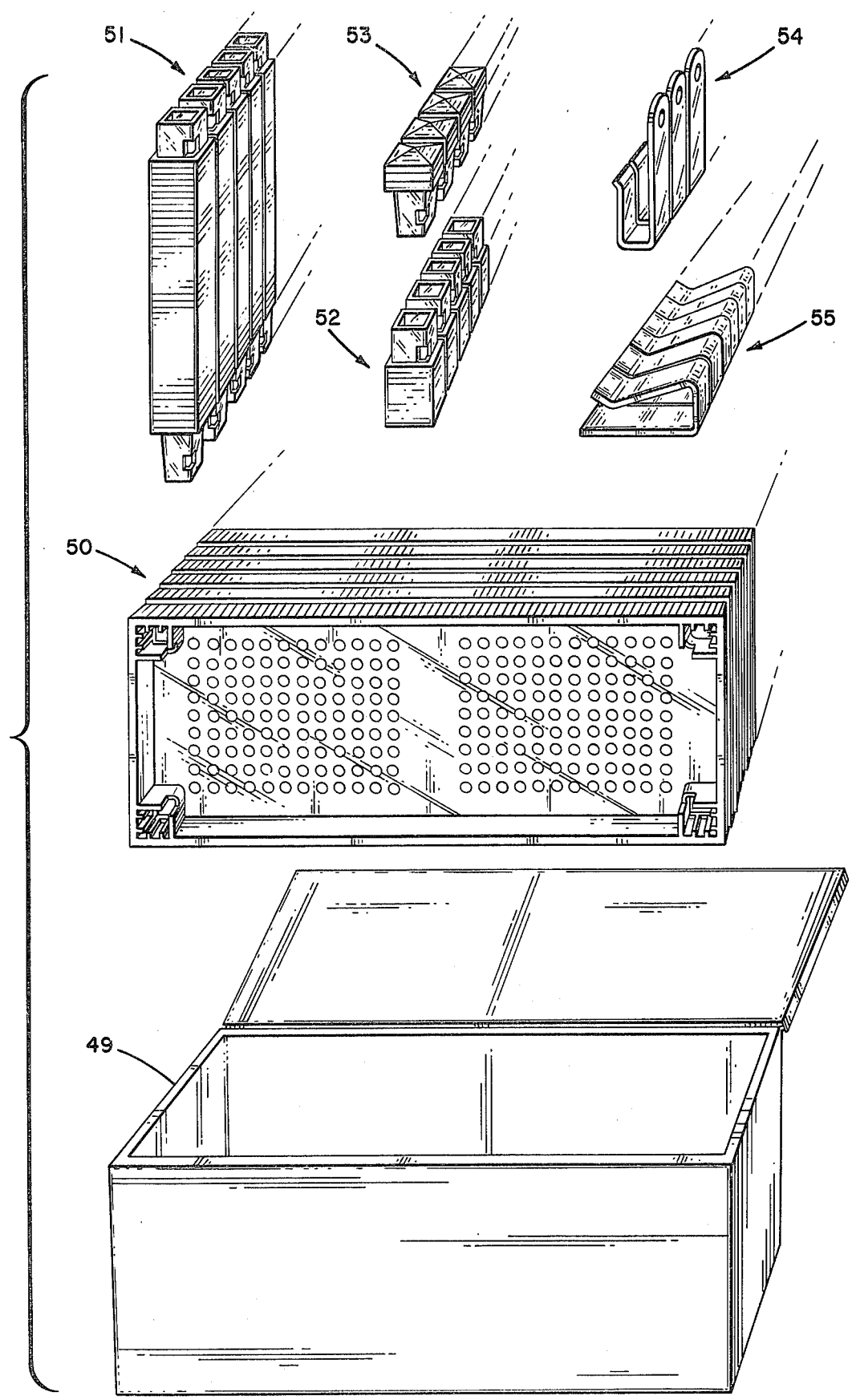

FIG. 8 shows the completely disassembled basic components of the present invention and the manner in which they can readily be packed and shipped. Thus, there is shown in the lower portion of FIG. 8 a shipping container 49 for receiving stacked shelves 50. Also receivable in the container are stacked legs 51, stacked foot rests 52, stacked caps 53, stacked wall hanging supports 54 and finally, stacked securing clips 55.

It can now readily be appreciated that a consumer can exercise his ingenuity in building up any desired number of shelves to provide any type of shelf assembly appropriate for a particular application. Moreover, and as described in conjunction with FIGS. 1 and 3, any completed assembly can either be self standing or wall mounted.

Finally, either a self standing assembly or a wall mounted assembly can readily be moved without fear of component parts becoming separated. In other words, the simple corner clip securing means assures a mechanical locking of the component parts together and yet this clip can readily be manually removed for disassembly purposes when desired.

It is thus seen that the present invention has provided an extremely versatile, light and compact shelving system readily assembled and disassembled without requiring tools, all to the end that problems associated with prior art systems are overcome.

What is claimed is:

1. A knock-down shelving system including, in combination:
   (a) a plurality of shelves having shelf openings;
   (b) a plurality of leg supports each having on upper end portion receivable in the bottom of a shelf opening and a lower end portion receivable in the top of a shelf opening and within the top end portion of another of said legs already positioned in the bottom of said shelf opening; and
   (c) manually insertable securing means for passing through side wall portions of said shelf opening, upper end portion and lower end portion when nested together to secure the leg supports to the shelves whereby any desired number of shelves and leg supports can be manually assembled and disassembled without the need of tools.

2. A system according to claim 1, in which one of said arms terminates in an outwardly directed tip edge to facilitate initial positioning of said other arm against said adjacent exterior wall preparatory to sliding said clip into securing position.

3. A knock-down shelving system including in combination:
   (a) a plurality of rectangular shelves, each shelf defining at each of its four corners a square shelf opening extending from the top to the bottom of the shelf;
   (b) a plurality of leg supports of a given length defining the spacing between shelves when the shelving system is assembled, each leg support having an upper end portion of square cross section dimensioned to be received in the bottom of the square shelf opening at a shelf corner, and a lower end portion of square cross section dimensioned to be received in the top of the square shelf opening and of smaller size than said upper end portion so as to be received in nesting relationship in the upper end portion of another leg support already received in the bottom of said square shelf opening, a side wall of the square shelf opening and corresponding side walls of the upper and lower end portions of the leg supports having windows which are aligned in registration with each other when leg supports are positioned in the bottom and top of the square shelf opening in nesting relationship; and
   (c) a plurality of clips, each clip comprising a spring metal strip bent into a U-shape with the arms of the U biased towards each other and with one arm longer than the other whereby said one arm of a clip can be manually passed through the registering windows with the other arm engaging the exterior adjacent wall of the square shelf opening in the shelf corner to secure the leg supports to the shelf, and whereby similar additional clips can be used to secure leg supports at the other corners of the shelf and to other shelves to thereby provide a shelving system in which any desired number of shelves can be assembled and secured by said clips as a unitary standing system and subsequently disassembled if desired by manual removal of the clips so that no tools are required for assembly and disassembly.

4. A system according to claim 3, including foot supports having upper end portions of square cross section identical to the upper end portions of each leg support and caps having lower end portions of square cross section identical to the lower end portions of each leg support whereby the underside of the bottom-most shelf in a shelving system can be supported by said foot supports and the top side of the topmost shelf in said shelving system can be finished off with said end caps.

5. A system according to claim 3, in which an exterior wall of said upper end portion of each leg support and an interior wall of each square shelf opening include cooperating means permitting insertion of said upper end portion in the bottom of said square shelf opening in only one orientation so that registration of the window in the upper end portion of the leg support with the window in the wall of the square shelf opening is assured when said upper end portion is fully axially positioned in said square shelf opening.

6. A system according to claim 6, in which said cooperating means includes a lateral projection on said upper end portion and a channel defined in the interior wall of said square shelf opening receiving said projection.

7. A system according to claim 3, in which each shelf has a downwardly depending side wall defining two side wall portions of the square shelf opening at each corner; and wall hanging supports each comprising a single strip having a lower portion bent into a hook shape for engaging under a lower edge portion of the downwardly depending side wall of the shelf and an upper portion with a fastener receiving hole for securement to a wall, whereby a shelving assembly can readily be mounted to a wall.

* * * * *